United States Patent [19]

Bavis

[11] Patent Number: 4,645,035

[45] Date of Patent: Feb. 24, 1987

[54] MODULAR CONVEYOR SYSTEM FOR DRIVE-IN BANKS AND THE LIKE

[76] Inventor: Edward F. Bavis, 201 Grandin Rd., Mainesville, Ohio 45039

[21] Appl. No.: 623,007

[22] Filed: Jun. 21, 1984

[51] Int. Cl.⁴ .............................................. E04H 3/04
[52] U.S. Cl. .................................... 186/37; 198/604; 198/607; 406/110
[58] Field of Search ...................... 186/35–37, 186/58–60, 26, 33, 51, 52, 69, 41, 53; 109/66; 198/570, 575, 603–607, 620, 626, 628; 187/3, 58; 406/110–112, 177, 191

[56] References Cited

U.S. PATENT DOCUMENTS

| | | | |
|---|---|---|---|
| 1,934,059 | 11/1933 | Griffith et al. | 198/604 X |
| 2,028,235 | 1/1936 | Needham | 198/604 X |
| 2,053,315 | 9/1936 | Barnecott | 198/604 X |
| 2,140,595 | 12/1938 | Rapley | 198/604 |
| 2,700,433 | 1/1955 | Ellithorpe | 186/37 |
| 2,896,748 | 7/1959 | McClintock | 186/37 |
| 3,180,481 | 4/1965 | Brause | 198/604 X |
| 3,525,482 | 8/1970 | Kramer | 406/191 |
| 3,985,316 | 10/1976 | Weissmuller | 406/110 |
| 4,010,824 | 3/1977 | Bavis | 186/37 |
| 4,032,082 | 6/1977 | Weissmuller | 406/112 |
| 4,195,724 | 4/1980 | Janitsch | 198/626 |
| 4,311,211 | 1/1982 | Benjamin et al. | 186/53 |
| 4,457,422 | 7/1984 | Hurd | 198/604 |
| 4,546,857 | 10/1985 | Hamada et al. | 186/37 |

Primary Examiner—Charles A. Marmor
Assistant Examiner—Kevin P. Shaver
Attorney, Agent, or Firm—Frost & Jacobs

[57] ABSTRACT

A system for conveying a transfer box between a first station and a remote second station wherein a pair of vertical modules are interconnected at their upper ends by a horizontal module. The modules each comprising a tubular housing, such as a cylindrical tube. The vertical modules each contain a conveyor composed of an opposing pair of conveyor belts arranged to convey a deposit box therebetween in a sinuous path of travel. The horizontal module contains a slide plate along which a horizontal conveyor belt is adapted to travel. The vertical modules have transfer belts at their uppermost ends to transfer a deposit box between the vertical and horizontal modules. The conveyor belts in the vertical and horizontal modules are interconnected for joint movement and driven by a single power source.

12 Claims, 8 Drawing Figures

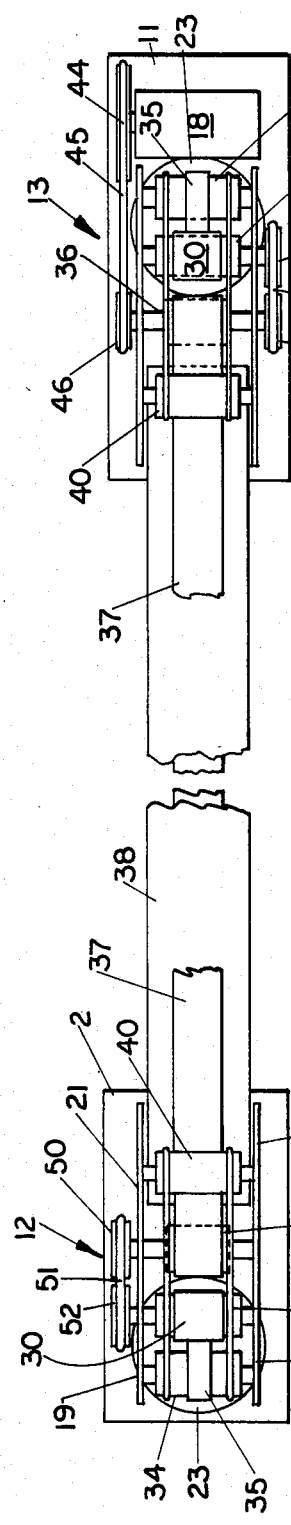
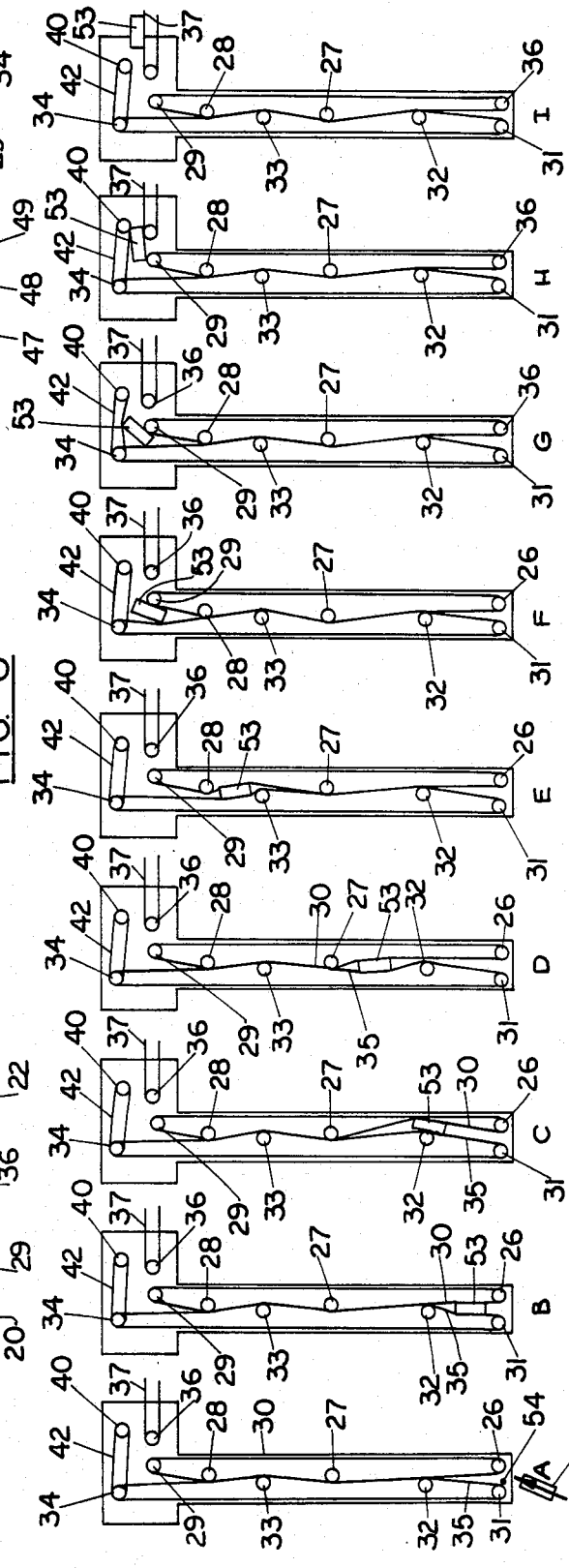
FIG. 3
FIG. 4A-I

… …

MODULAR CONVEYOR SYSTEM FOR DRIVE-IN BANKS AND THE LIKE

This invention relates to conveyors and more particularly to a modular conveyor system for conveying an article receiving box or similar receptacle between a spaced apart pair of stations.

BACKGROUND OF THE INVENTION

The present invention relates to a conveyor system particularly suited for use in drive-in banks to convey a deposit box or similar receptacle from a remote customer station to a teller station and return; although the system may be used in any application wherein it is desired to transport documents or articles from one location to another. Specifically, the present invention constitutes an improvement over the type of conveyor system taught in U.S. Pat. No. 4,010,824, issued Mar. 8, 1977 wherein a pair of self-contained vertical modules, one at the customer station and the other at the teller station, are interconnected by a horizontal module. The vertical modules each incorporate opposing sets of conveyor belts arranged to convey the deposit box therebetween in a vertical path of travel, the sets of belts being guided by staggered sets of idler rolls positioned to cause the sets of belts and the deposit box to move in a sinuous path of travel so that the box is securely engaged by the sets of belts and cannot fall or slip vertically. The horizontal module contains a belt conveyor for moving the deposit box horizontally from one end of the module to the other, translation means being provided at the opposite ends of the horizontal module for moving the deposit box from the horizontal module to the vertical modules and vice versa.

While the system just described has gone into widespread use and has been found to be highly efficient and essentially trouble free, the system is nonetheless relatively complicated and involves the use of a substantial number of conveyor belts, frame assemblies and other operating components. Even though relatively inexpensive as compared with other types of systems, a need was felt for a simpler and less expensive system to reach further segments of the potential market for such systems.

SUMMARY OF THE INVENTION

The present invention materially simplifies the existing system by replacing the box-like module-forming frames with essentially one-piece tubular housings which mount the operating components of the system, the housings preferably being formed of readily available high strength plastic tubing.

In the case of the vertical modules, the operating components of the system comprise a pair of spaced apart support plates which mount the belt guiding rollers, the plates terminating at their upper ends in horizontally extending projections which mount additional belt supporting rollers to effect translation of the deposit box from one plane to the other.

The horizontal module is also defined by a tubular housing which mounts a single horizontally disposed slide plate forming a support for a horizontal conveyor belt which transports the deposit box through the horizontal module, the return flight of the horizontal belt passing beneath the slide plate. The dimensioning of the parts is such that the tubular wall surfaces of the housing serve as edge guides for maintaining the alignment of the deposit box as it moves through the horizontal module.

The system is further simplified in that the entire belt system is interconnected for movement in unison, being driven by a single reversible motor, the direction of movement of the belts being reversed depending upon the desired direction of movement of the deposit box.

An improved and simplified belt arrangement is also provided which one of the belts in each vertical module is utilized to drive the opposing belt, thereby simplifying the number of parts required to drive the system, the vertical belts also coacting with simplified translation belts to effect movement of the deposit boxes from vertical to horizontal position, and vice versa, as well as insure that the box will remain closed as it travels through the system.

DESCRIPTION OF THE DRAWINGS

FIG. 3 is a top plan view of the system with parts broken away.

FIG. 4A–I is a series of diagrammatic views illustrating sequentially the manner in which a deposit box is conveyed through the system.

DESCRIPTION OF THE PREFERRED EMBODIMENT

While the present invention will be described in conjunction with a drive-in bank facility, it will be understood that the system will find utility in other applications wherein it is desired to convey documents or other articles from one location to another and return.

Figure 1:
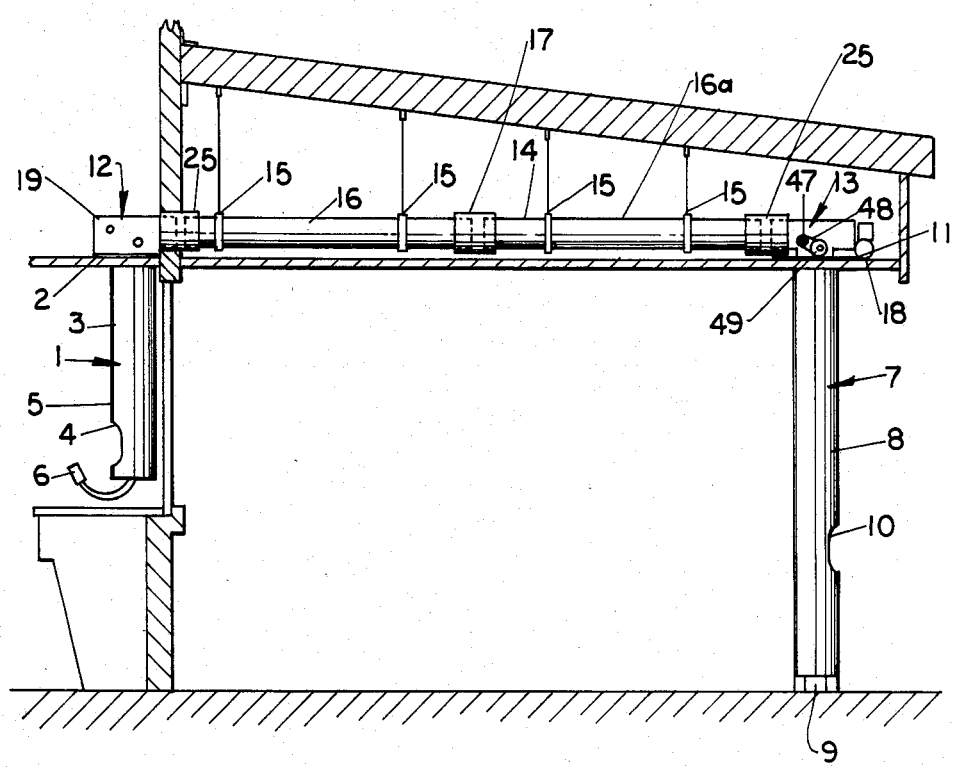
FIG. 1 is a vertical sectional view illustrating a modular conveyor system in accordance with the present invention.

Referring first to FIG. 1, which illustrates a conveyor system in accordance with the invention, the system comprises a first vertical module, indicated generally at 1, which in this instance is positioned at a teller's station inside the bank building, the module being suspended from the ceiling by means of a support plate 2. The module 1 comprises a self-sustaining rigid tubular housing 3 preferably formed from high strength cylindrical plastic tubing, the tubing having an access opening 4 adjacent its lower end which provides access to a seat or cradle for receiving a deposit or transfer box of known construction, preferably comprising a molded plastic box having an integral hinged lid adapted to be snap-locked to the box body when closed. The module 1 also mounts controls 5 by means of which the teller or other operator may control the operation of the system, although once the system is energized, the conveyor belts will be activated and deactivated automatically by the deposit box as it travels from one end of the system to the other. The vertical module 1 also may mount a microphone 6 by means of which a the teller may communicate with a customer or other party at the remote station.

A second vertical module 7 is mounted at a customer station remote from the teller station, usually in a drive-in area having an overlying roof. The module 7 has a tubular housing 8 which is preferable of a length to extend from the undersurface or ceiling of the roof structure to the ground where it is seated on a supporting foot 9. Module 7 has an access opening 10 positioned for convenient access by a customer seated in an automobile or other vehicle. The access opening 10 also contains a seat or cradle of a size to receive a deposit box. At its upper end the module 7 is secured to a support plate 11 similar to the plate 2, the plates 2 and 11 mounting the operating assemblies of the system, indicated generally at 12 and 13, respectively, which project downwardly within the vertical modules 1 and 7.

The vertical modules 1 and 7 are interconnected by a horizontal module 14, also of tubular construction, which may be suspended from the roof overlying the drive-in area by means of hangers 15 lying at spaced intervals along the length of the horizontal module.

Depending upon the size of the bank and the number of customers who use the drive-in facility, any number of the modular systems may be installed depending upon the number of lanes of traffic being handled, the only difference being in the length of the horizontal module which will depend upon the remoteness of a given drive-in lane from the teller station. Thus, the horizontal module may comprise a plurality of tubular housing members 16, 16a interconnected by a collar 17.

The operating assemblies 12 and 13 are adapted to be telescopically received in the tubular modules 1 and 7, respectively, being inserted from the upper ends of each module. The assemblies are basically of the same construction, although assembly 13 in the embodiment illustrated will be somewhat longer and its support plate 11 also mounts the drive motor 18 for the entire system, the various conveyor belts being driven from the single power source in a manner which will be described in detail hereinafter.

Figures 2, 7:
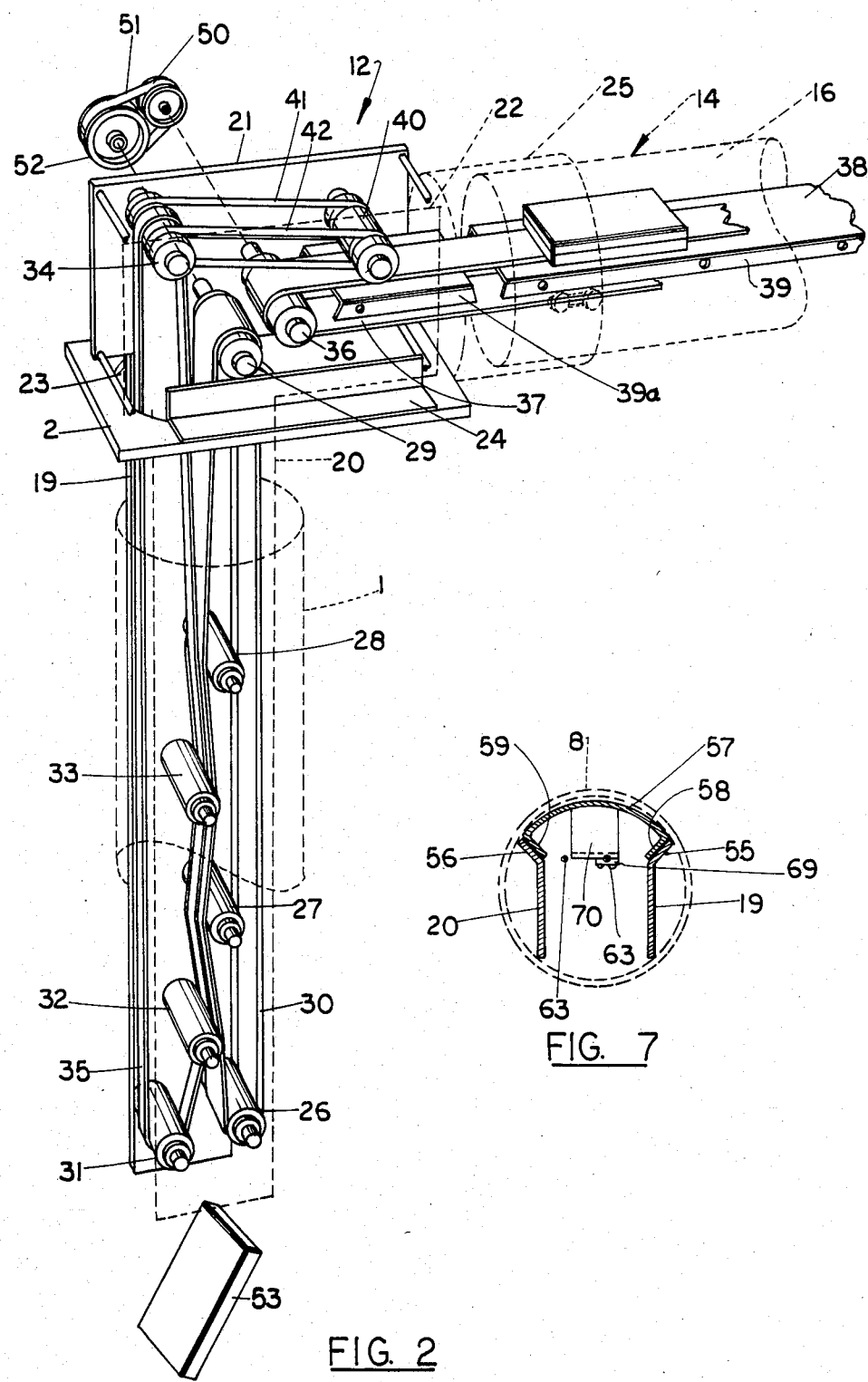
FIG. 2 is a fragmentary perspective view with parts broken away illustrating a vertical module at the teller end of the system and its association with the horizontal module.
FIG. 7 is a horizontal sectional view taken along the line 7—7 of FIG. 5.

Referring next to FIGS. 2 and 3, each of the assemblies 12 and 13 comprises an elongated pair of side plates 19 and 20 terminating at their upper ends in angularly disposed arms 21 and 22 adapted to seat on support plates 2 and 11, respectively, the upper ends of the side plates passing through openings 23 in the support plates. Angle bars 24 may be utilized to secure the assemblies 12 and 13 to their respective support plates. Preferably the tubular housings 3 and 8 will be detachably secured to the undersurfaces of the support plates by means of brackets (not shown). The horizontal module 14 is secured at its opposite ends to the assemblies 12 and 13 by means of collars 25 which may be bolted or otherwise secured to the angularly disposed arms 21 and 22 of the side plates 19 and 20. With this arrangement, the entire system may be suspended from the hangers 15, although if additional strength is required, the support plates 2 and 7 may be mounted on suitably placed braces or brackets (not shown) in the ceiling overlying the teller station and/or in the ceiling of the roof structure overlying the customer station.

Each of the operating assemblies includes sets of rollers 26–29 and 31–34 extending between the opposing side plates 19 and 20, the rollers 26, 27, 28 and 29 mounting a relatively wide inner belt 30, whereas rollers 31, 32, 33 and 34 mount a relatively narrow outer belt 35. The rolls 26 and 31 are spaced apart to form a nip therebetween of a size to receive the deposit box, whereas the rolls 27, 28 and 32, 33 lie in staggered relation with respect to each other and are arranged so that they are normally contacted by both belts 30 and 35. Each of the assemblies also includes a roller 36 which engages the opposite side of a horizontal belt 37 extending through the horizontal module 14, the upper flight of the belt 37 resting on a slide plate 38 mounted within module 14, the side plate having angular flanges 39 projecting downwardly from its opposite sides edges by means of which it may be secured to the opposing wall surfaces of tubular housing members 16, 16a of the horizontal module 14.

Each of the assemblies also mounts a roller 40 overlying the upper flight of belt 37, the roller 40 coacting with roller 34 to mount a pair of belts 41, 42 which act as translation means to move the deposit box from the vertical module to the horizontal module. Extensions 39a of the slide plate 38 may be secured to the arms 21 and 22 of the side plates to provide sliding support for the horizontal conveyor belt in the areas underlying rollers 40.

Referring to FIG. 3, the reversible drive motor 18 is mounted on support plate 11 of operating assembly 13, the motor mounting a driven sheave 44 which is connected by a drive belt 45 to a sheave 46 operatively connected to the roller 36 which engages the horizontal conveyor belt 37. Thus, when actuated, the motor 18 initially drives horizontal conveyor belt 37 through sheave 44, drive belt 45 and sheave 46. Roller 36 of operating assembly 13 mounts a sheave 47 at its opposite end which is connected by drive belt 48 to a sheave 49 operatively connected to roller 29 which mounts the relatively wide conveyor belt 30 of operating assembly 13. Belt 30 is thus driven from roller 36 through sheave 47, belt 48 and sheave 49. Belt 30 in turn drives the narrower outer conveyor belt 35 by reason of their face-to-face contact caused by the offset relationship of rollers 27, 28 relative to rollers 32, 33.

The belts 30 and 35 of operating assembly 12 are also driven by horizontal conveyor belt 37 acting through sheave 50 connected to roller 36 and drive belt 51 connected to sheave 52 which in turn is connected to roller 29. As in the case of operating assembly 13, the conveyor belt 30 is driven from horizontal conveyor belt 37, and the conveyor belt 35 is driven by belt 30 by reason of their face-to-face contact. In addition, the belt 35 drives the translation belts 41 and 42 through roller 34. Thus, the entire belt system is driven by the single reversible motor 43 utilizing only three pairs of sheaves and coacting drive belts.

The operation of the system can be best understood by reference to FIG. 4 which schematically traces the path of travel of a deposit box through the system. FIG. 4A illustrates the starting position of the deposit or transfer box 53 as it would be seated on the seat or cradle underlying rollers 26 and 31 of module 1. As the box is lifted from the seat by the teller it is urged upwardly between the rollers 26 and 31 where it will contact a limit switch 54 which will energize motor 14 to drive the horizontal conveyor belt 37 in reverse direction, namely, with roller 36 rotating in a clockwise direction as viewed in FIG. 4A. Such movement causes roller 29 to rotate in a clockwise direction, thereby causing the inner flight of belt 30 to move upwardly. The face-to-face contact between belts 30 and 35 also causes the inner flight of belts 35 to travel upwardly, the two belts moving in unison. Thus, as the deposit box 53 is pushed upwardly between rollers 26 and 31, it is engaged by the belts 30 and 35 in the manner seen in FIG. 4B. To this end, the belts 30 and 35 are formed from belting having sufficient resiliency to permit stretching of the belts to accommodate the deposit box therebetween. For example, the belts may comprise a fabric woven from fibers which are inherently stretchable or which incorporate elastic filaments.

As the box passes around the roller 32, it will expand the belt 30 in the manner seen in FIG. 4C, but there is nonetheless sufficient resistance to prevent the box from slipping downwardly. As the deposit box passes beyond the roller 32, it will assume the position illustrated in FIG. 4D, wherein it will be seen that the box is firmly clamped between the belts 30 and 35, the arrangement again being such that the box cannot slip downwardly. Similar considerations apply as the box sequentially passes around rollers 27, 33, and 28 as it continues its upward movement, as shown in FIG. 4E.

As the deposit box passes upwardly beyond roller 29, it tends to rotate about roller 29 in a clockwise direction, the uppermost end of the box contacting overlying translation belts 41, 42, the lower flights of which are moving in a direction from left to right and, as will be seen by comparing FIGS. 4F, 4G and 4H, the box 53 is turned from a vertical to a horizontal position, the roller 40 acting to urge the box into contact with the upper flight of horizontal conveyor belt 37 which, it will be remembered, is moving in a left to right direction, the box being advanced through the horizontal module by reason of its being seated on the conveyor belt 37 and underlying slide plate 38. In addition, the position of the roller 40 relative to the underlying plate 39a is such that the lid of the box will be closed should it accidentally pop open during transfer of the box from one module to another.

Upon reaching the opposite end of the horizontal module 14, the box will come under the influence of the conveyor belts of assembly 13 which will convey it downwardly for discharge into the cradle underlying the rollers 26 and 31 of assembly 13 at access opening 10. In essence, the movement is the reverse of that illustrated in FIG. 4A–I, the box being transferred from belt 37 to the belts 30 and 36 of assembly 13 under the influence of roller 29 with the cooperation of overlying translation roller 40 and belts 41, 42, the leading end of the box being urged downwardly between the downwardly moving belts 30 and 35. As the box passes downwardly between the rollers 26 and 31 for discharge into the underlying cradle at access opening 10, it will contact a second limit switch, similar to the switch 53, which will serve to deenergize drive motor 18 and hence stop the movement of the conveyor belts.

Upon delivery of the deposit box to the customer station, the customer may remove the box through the access opening 10, insert or remove the contents, return the box to its cradle, and then start it on its return journey by pushing it upwardly between the nip of rolls 26 and 31 where it will contact a limit switch which will energize drive motor 18 in the opposite direction to initiate movement of the conveyor belts in the direction to return the box to the teller station.

It will be understood that the controls 5 at the teller station will include switch means for overriding the limit switches so that the teller may initiate or stop movement of the conveyor belts at any point in the operating cycle, or reverse their movement so that the deposit box may be returned to either station.

Figure 5:
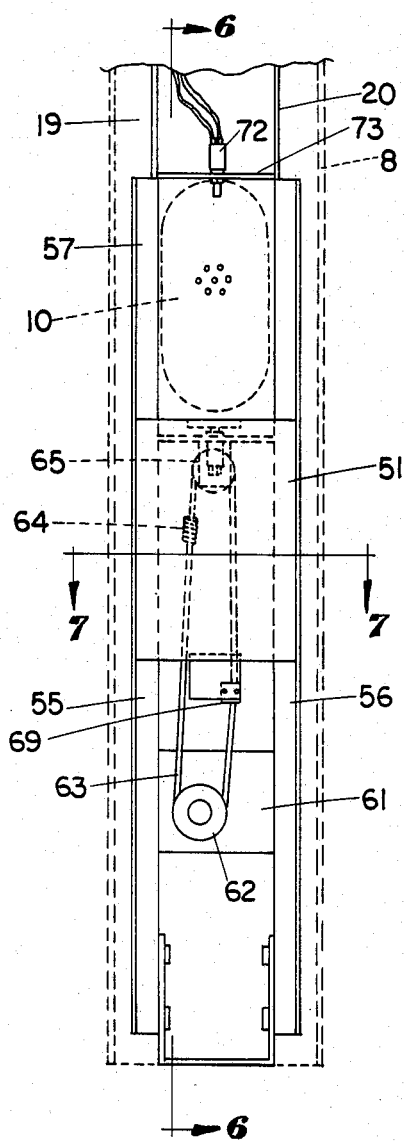
FIG. 5 is a fragmentary front elevational view of the mechanism at the customer station for closing the access opening.
Figure 6:
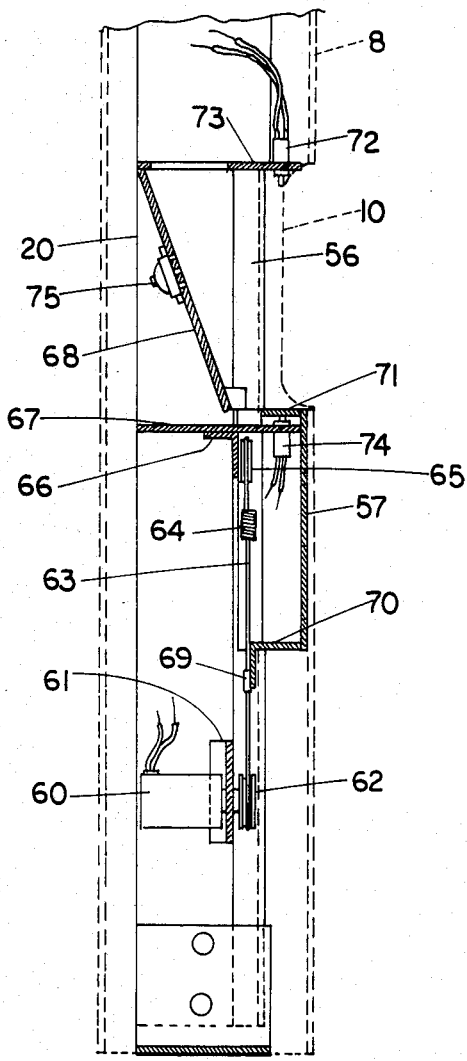
FIG. 6 is a vertical sectional view taken along the line 6—6 of FIG. 5.

The operator controls may also include switch means for opening and closing the access opening 10 at the customer station. To this end, and as seen in FIGS. 5 and 6, the side plates 19 and 20 of assembly 13 at the customer station are provided with angularly disposed flanges 55 and 56 extending downwardly from the upper end of access opening 10, the flanges defining slide tracks for a sliding door adapted to close access opening 10 when in its elevated position. As best seen in FIG. 7, the door 57 is of curved configuration, conforming to the curvature of tubular housing 8 of module 7. The door has inturned angularly disposed flanges 58 and 59 adapted to seat on the outturned flanges 55 and 56, respectively, of side plates 19 and 20. With this arrangement, the door 57 will slide vertically along the flanges 55 and 56 and is maintained in alignment with the latter flanges by means of the overlying portion of the tubular housing 8.

The door 57 is raised and lowered by means of a reversible motor 60 mounted on a bracket 61 extending between the side plates 19 and 20 adjacent their lower extremity, the reversible motor driving a pulley wheel 62 about which is wrapped a flexible cable 63 which forms an endless loop, although preferably the cable will incorporate a coil spring 64 to provide resiliency in the event the door mechanism should jamb. The cable extends upwardly around a pulley wheel 65 rotatably mounted on a bracket 66 secured to a plate 67 underlying the access opening 10, the plate providing a seat for the cradle 68 which receives the deposit box. The opposite flight of the cable is fixedly secured by a clamp 69 affixed to a bracket 70 at the lower extremity of door 57. With this arrangement, when the sheave 62, as seen in FIG. 5, is energized in a counter-clockwise direction, the cable 64 will move in a counter-clockwise direction and the door 57 will move upwardly, thereby closing access opening 10. The door 57 mounts an inwardly directed flange 71 at its upper end which contacts a limit switch 72 mounted on a plate 73 when the door is fully closed, thereby deenergizing the motor 60.

Normally, the door will remain open during banking hours and closed during non-banking hours, and to this end the controls at the teller's station will include switch means for energizing the reversible motor 60 to either open or close the access door. When the motor is energized to open the access door, the door will move downwardly until the inwardly directed flange 71 at its upper end contacts the limit switch 74 which will automatically deenergize motor 60 when the door is fully opened. The flange 73 will preferably be of semicircular configuration and of a size to form a platform extending inwardly to the lower extremity of cradle 68.

The cradle 68 may be provided with a speaker/microphone 76 by means of which the customer and teller may communicate. The customer station may also be provided with a push-switch to sound a buzzer or other signal to the teller that there is a customer at the station.

Figure 8:
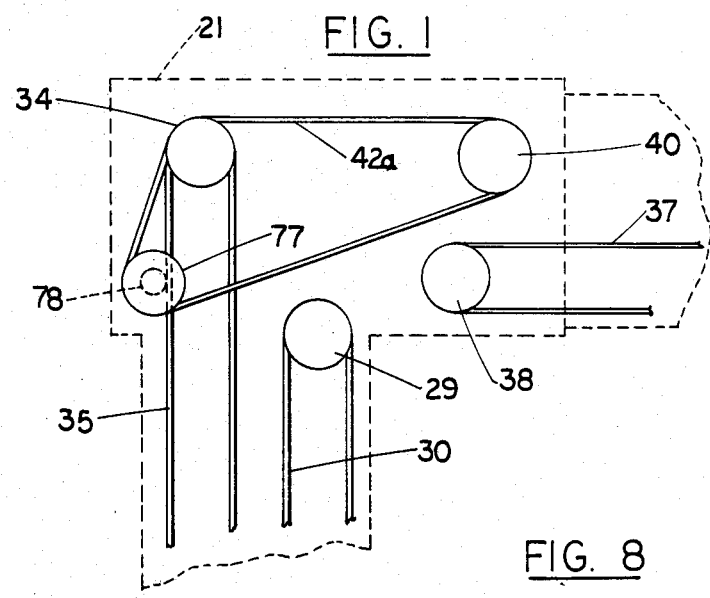
FIG. 8 is a fragmentary side elevational view of a modified translation belt arrangement.

FIG. 8 illustrates a modified translation belt arrangement wherein the lower flights of the translation belts, one of which is shown at 42a, pass around a roller 77 displaced downwardly from roller 34 to provide more positive control of the transfer box as it moves between the vertical and horizontal modules. It has been found that in cold climates the transfer box tends to bounce off the belts, particularly when traveling from the horizontal to the vertical. The inclined position of the lower flights of the translation belts eliminates this problem. As illustrated, the roller 77 may have a central portion 78 of reduced diameter to accommodate outer belt 35.

As should now be apparent, the present invention provides a simplified modular conveyor system utilizing simple yet effective tubular modules which contain the operating components of the system, the operating components being readily removable from the housings for service and repair. The system is versatile in that the vertical modules may be provided in standard length, and the horizontal modules may be made to any desired length depending upon the distance to be traversed between the teller's station and the customer station.

Other modifications may be made in the invention without departing from its spirit and purpose. For example, it will be evident that the positions of the operating assemblies 12 and 13 can be reversed, with the drive motor 18 and its associated drive mechanism mounted at the upper end of module 1 rather than module 7. In some applications, as where a system is utilized to convey documents and other articles between remote stations, such as in a health care facility, an industrial plant or the like, both stations may be provided with operator controls to recall and otherwise control the direction of movement of the box as it travels through the system.

What is claimed is:

1. In a conveyor system for conveying a transfer box between a first station and a remote second station, each of said stations having a ceiling, a first vertically disposed module at the first station, a second vertically disposed module at the second station, and a horizontal module interconnecting the upper ends of the vertical modules;

said vertical modules each comprising a support plate secured to the ceiling, an elongated conveyor assembly having an elongated pair of spaced apart side plates connected at their upper ends to and suspended from said support plate and extending downwardly therefrom, a hollow cylindrical housing surrounding and enclosing said conveyor assembly, said housing being suspended from said support plate, and an access opening in said housing adjacent the lower end of said conveyor assembly;

said conveyor assemblies each having belt supporting guide rollers extending between said side plates, an opposing pair of conveyor belts mounted on said guide rollers, said belts being adapted to receive and convey a transfer box therebetween in a vertical path of travel, translation means at the upper ends of said conveyor belts for transferring the transfer box between the vertical modules and the horizontal module;

said horizontal module comprising a hollow cylindrical housing having an elongated slide plate therein, and a horizontal conveyor belt extending lengthwise along said slide plate, the ends of said horizontal conveyor belt being positioned to coact with said translation means to transfer the transfer box from one module to the other; and reversible drive means interconnecting the conveyor belts in said vertical and horizontal modules for movement in unison.

2. The conveyor system claimed in claim 1 including a door for closing the access opening in the vertical module at the second station, said door being of curved configuration corresponding to the curvature of said hollow cylindrical housing, angular flanges projecting inwardly from the opposite sides of said door, and mating angular flanges mounted on the conveyor assembly housed in said last named module, said mating angular flanges extending downwardly from adjacent the angular upper end of said access opening to provide slide tracks for said door, and reversible drive means for sliding said door vertically from a closed position in which it closes said access opening to an open position in which the door underlies said access opening.

3. The conveyor system claimed in claim 2 wherein the reversible drive means for said access opening comprises a vertical motor underlying said door when in the opened position, and a cable operatively connecting said motor and said door, said cable passing around a pulley wheel on said motor and a pulley wheel mounted adjacent the bottom of said access opening, said cable being secured to said door adjacent its bottom end.

4. The conveyor system claimed in claim 1 wherein the opposing belts in said vertical modules comprise inner and outer conveyor belts, the inner conveyor belts being of substantially greater width than the outer conveyor belts.

5. The conveyor system claimed in claim 4 wherein said inner and outer conveyor belts have inner and outer flights, and guide rolls spanning the width of the belts and positioned to juxtapose the inner flights of said belts in face-to-face relation throughout a portion of their common lengths, whereby one of the belts drives the other.

6. The conveyor system claimed in claim 5 wherein said guide rolls are positioned to cause the inner flights of said inner and outer conveyor belts to move in a sinuous path of travel.

7. The conveyor system claimed in claim 1 wherein the opposing conveyor belts in said vertical modules comprise inner and outer belts each having an inner and an outer flight, wherein the upper end of the outer conveyor belt projects upwardly beyond the upper end of the inner conveyor belt, and wherein said translation means comprises at least one transfer belt extending from the upper end of the outer conveyor belt to a position overlying the adjacent end of the horizontal conveyor belt.

8. The conveyor system claimed in claim 7 wherein the upper end of said outer conveyor belt and the adjoining end of said transfer belt pass around a common support roller, said transfer belt being driven by said outer conveyor belt.

9. The conveyor system claimed in claim 8 wherein said reversible drive means comprises a reversible motor, drive belts connecting said motor to said horizontal conveyor belt, and additional drive belts connecting said horizontal conveyor belt to the inner conveyor belts of said vertical module, whereby said inner conveyor belts are driven by said horizontal conveyor belt.

10. In a conveyor system for use in drive-in banks and the like for conveying a deposit box between a spaced-apart pair of conveyor stations each having a ceiling, a first vertically disposed module at one of said stations, a second vertically disposed module at the other of said stations, and a horizontal module extending between the upper ends of said first and second modules;

said modules each comprising an enclosing tubular housing, and reversible conveyor means in each of said tubular housing;

said vertical modules each comprising a support plate secured to the ceiling, an elongated pair of spaced apart side plates connected at their upper ends to and projecting downwardly from said support plate and surrounded by one of said tubular housings, said surrounding tubular housing being suspended from said support plate;

said conveyor means in each of said vertical modules comprising a pair of opposing flat conveyor belts each having an inner flight and an outer flight, belt supporting rollers at the opposite ends of said opposing conveyor belts extending between said side plates, guide rolls extending between said side plates and engaging the inner flights of said conveyor belts, said guide rolls being positioned to define a sinuous path of travel between the inner flights of said conveyor belts, and an access opening in the housing of each vertical module underlying the lowermost ends of said opposing conveyor belts;

said conveyor means in said horizontal module comprising an endless conveyor belt having upper and lower flights, guide rollers at the opposite ends of said horizontal conveyor belt, a slide plate extending lengthwise of the horizontal module intermediate the upper and lower surfaces of the surrounding tubular housing, the upper flight of said horizontal conveyor belt being slidably supported on the upper surface of said slide plate with the lower flight of the horizontal conveyor belt underlying said slide plate;

drive means interconnecting the guide rollers at the opposite ends of said horizontal conveyor belt with one of the belt supporting rollers at the uppermost end of the adjoining vertical module; and translation means at the upper end of each of said vertical modules, said translation means comprising at least one transfer belt extending between a belt supporting roller overlying the adjacent end of said horizontal conveyor belt and the belt supporting roller at the upper end of the outermost vertical conveyor belt, said last named belt supporting roller being spaced upwardly from the guide roller at the upper end of the innermost vertical conveyor belt.

11. The conveyor system claimed in claim 10 wherein the tubular housings of said vertical modules comprise one-piece cylindrical tubes.

12. The conveyor system claimed in claim 11 wherein the tubular housing of said horizontal module comprises a plurality of cylindrical tubes arranged in axial alignment and interconnected by collars surrounding the adjoining ends of adjacent tubes.

* * * * *